United States Patent
Kim et al.

(10) Patent No.: US 12,012,039 B2
(45) Date of Patent: Jun. 18, 2024

(54) APPARATUS AND METHOD FOR GENERATING SOUND OF ELECTRIFICATION VEHICLE

(71) Applicants: Hyundai Motor Company, Seoul (KR); Kia Corporation, Seoul (KR)

(72) Inventors: Ki Chang Kim, Gyeonggi-do (KR); Dong Chul Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 164 days.

(21) Appl. No.: 17/942,631

(22) Filed: Sep. 12, 2022

(65) Prior Publication Data

US 2023/0294601 A1 Sep. 21, 2023

(30) Foreign Application Priority Data

Mar. 15, 2022 (KR) .................. 10-2022-0032312

(51) Int. Cl.
*B60Q 5/00* (2006.01)
*B60W 40/101* (2012.01)

(52) U.S. Cl.
CPC .......... *B60Q 5/008* (2013.01); *B60W 40/101* (2013.01); *B60Y 2306/11* (2013.01)

(58) Field of Classification Search
CPC ... B60Q 5/008; B60W 40/101; B60Y 2306/11
See application file for complete search history.

(56) References Cited

U.S. PATENT DOCUMENTS

| 5,635,903 | A | * | 6/1997 | Koike | B60Q 5/008 340/384.1 |
|---|---|---|---|---|---|
| 9,057,334 | B2 | | 6/2015 | Iseda et al. | |
| 10,418,022 | B2 | * | 9/2019 | Niibe | G10K 15/02 |
| 2007/0269054 | A1 | * | 11/2007 | Takagi | A63F 13/57 381/71.4 |
| 2015/0123897 | A1 | * | 5/2015 | Takahagi | A63H 30/04 345/156 |
| 2017/0182413 | A1 | * | 6/2017 | Takahagi | A63F 13/428 |
| 2019/0256103 | A1 | * | 8/2019 | Capua | B60W 40/101 |

(Continued)

FOREIGN PATENT DOCUMENTS

| JP | H06162365 | A | * | 11/1992 | |
|---|---|---|---|---|---|
| JP | H06219227 | A | * | 1/1993 | B60R 21/00 |

(Continued)

*Primary Examiner* — Andrew W Bee
(74) *Attorney, Agent, or Firm* — Fox Rothschild LLP

(57) ABSTRACT

An apparatus and a method for generating a sound of an electrification vehicle are provided. The apparatus comprises a detection device configured to detect state information of a vehicle, a sound output device configured to play and output a virtual sound, and a processing device connected with the detection device and the sound output device. The processing device configured to detect a cornering state of the vehicle based on state information of the vehicle, analyze a longitudinal force, a lateral force, a tire slip ratio, and a tire slip angle according to the cornering state, calculate a cornering force based on the analyzed results, calculate a contact force based on a tire ground surface and road surface profile based on big data, generate a tire slip sound based on the cornering force and the contact force, and control the sound output device to play the tire slip sound.

12 Claims, 6 Drawing Sheets

(56) References Cited

U.S. PATENT DOCUMENTS

| | | |
|---|---|---|
| 2020/0290577 A1* | 9/2020 | Berntorp .............. B60W 40/068 |
| 2022/0207935 A1* | 6/2022 | Kim ......................... H04R 3/00 |
| 2022/0324465 A1* | 10/2022 | Sakagami ....... B60W 30/18109 |
| 2022/0355732 A1 | 11/2022 | Kim et al. |
| 2022/0357912 A1 | 11/2022 | Kim et al. |

FOREIGN PATENT DOCUMENTS

| | | |
|---|---|---|
| JP | 3179227 B2 | 6/2001 |
| KR | 101744716 B1 | 6/2017 |
| KR | 101856935 B1 | 5/2018 |
| KR | 102131390 B1 | 7/2020 |
| KR | 10-2020-0094507 A | 8/2020 |
| KR | 10-2022-0150692 A | 11/2022 |
| KR | 10-2022-0152829 A | 11/2022 |

* cited by examiner

APPARATUS AND METHOD FOR GENERATING SOUND OF ELECTRIFICATION VEHICLE

CROSS-REFERENCE TO RELATED APPLICATION(S)

This application claims, under 35 U.S.C. § 119(a), the benefit of Korean Patent Application No. 10-2022-0032312, filed in the Korean Intellectual Property Office on Mar. 15, 2022, the disclosure of which is incorporated herein by reference in its entirety.

BACKGROUND

Technical Field

Embodiments of the present disclosure relate to an apparatus and a method for generating a sound of an electrification vehicle to generate a tire slip sound when the vehicle turns.

Description of the Related Art

As an electrification vehicle (e.g., an electric vehicle, a hydrogen electric vehicle, or the like) drives using its electric motor and, because there is no engine sound in the electrification vehicle, it is difficult for a pedestrian to recognize an approaching electrification vehicle. To address this, a virtual engine sound system (VESS) or an acoustic vehicle alerting system (AVAS), which generates a virtual engine sound and allows a pedestrian to recognize the virtual engine sound, has been developed and has been compulsorily installed in electrification vehicles.

The VESS or the AVAS implements an engine sound using an electronic sound generator (ESG). The ESG is mounted on a cowl top panel of the vehicle to generate an additional sound (or a structure vibration sound) using vehicle body vibration when the engine sound is generated. However, as allophone occurs in a weld part of a body cowl bracket loaded with the ESG and a cowl top cover, quality costs for structural reinforcement and vibration insulation are excessive.

SUMMARY

The present disclosure has been made to solve the above-mentioned problems occurring in the existing technologies while advantages achieved by the existing technologies are maintained intact.

An aspect of the present disclosure provides an apparatus and a method for generating a sound of an electrification vehicle to generate a tire slip sound when a ground slip of the vehicle occurs, when the vehicle turns.

The technical problems to be solved by the present disclosure are not limited to the aforementioned problems, and any other technical problems not mentioned herein will be clearly understood from the following description by those skilled in the art to which the present disclosure pertains.

According to an exemplary embodiment of the present disclosure, an apparatus for generating a sound of an electrification vehicle may comprise a detection device configured to detect state information of the vehicle, a sound output device configured to play and output a virtual sound, and a processing device connected with the detection device and the sound output device. The processing device may be configured to detect a cornering state of the vehicle based on the state information of the vehicle, may analyze a longitudinal force, a lateral force, a tire slip ratio, and a tire slip angle according to the cornering state, generating analyzed results, and may calculate a cornering force based on the analyzed results, may calculate a contact force based on a tire ground surface and road surface profile based on big data, may generate a tire slip sound based on the cornering force and the contact force, and may control the sound output device to play the tire slip sound.

The processing device may be configured to determine whether a vehicle driving state is a cornering state based on a driver steering angle and a tire steering angle input from the detection device.

The processing device may be configured to measure a vehicle body displacement based on the longitudinal force, the lateral force, and the driver steering angle to detect a vibration signal and may detect a pressure and temperature deviation between tires based on the tire slip ratio, the tire slip angle, and the tire steering angle.

The processing device may be configured to generate an initial sound source of the tire slip sound based on the cornering force and may predict a slip ratio and a slip angle of the vehicle based on the tire steering angle and may adjust volume of the tire slip sound depending on the predicted slip ratio and the predicted slip angle of the vehicle.

The processing device may be configured to determine a time point when the tire slip sound is generated, based on the longitudinal force and the lateral force.

The processing device may be configured to calculate a shear contact force due to a slip angle by the lateral force and friction on a tire ground surface and may reflect a correlation between the shear contact force and the tire slip sound to design the tire slip sound.

According to an exemplary embodiment of the present disclosure, a method for generating a sound of an electrification vehicle may comprise detecting, by a processing device, a cornering state of the vehicle based on state information of the vehicle, the state information being detected by a detection device, analyzing, by the processing device, a longitudinal force, a lateral force, a tire slip ratio, and a tire slip angle according to the cornering state of the vehicle and calculating, by the processing device, a cornering force based on the analyzed results, calculating, by the processing device, a contact force based on a tire ground surface and road surface profile based on big data, generating, by the processing device, a tire slip sound based on the cornering force and the contact force, and controlling, by the processing device, a sound output device to play the tire slip sound.

The detecting of the cornering state of the vehicle may comprise determining whether a vehicle driving state is a cornering state based on a driver steering angle and a tire steering angle input from the detection device.

The calculating of the cornering force may comprise measuring a vehicle body displacement based on the longitudinal force, the lateral force, the driver steering angle to detect a vibration signal and detecting a pressure and temperature deviation between tires based on the tire slip ratio, the tire slip angle, and the tire steering angle.

The generating of the tire slip sound may comprise generating an initial sound source of the tire slip sound based on the cornering force, predicting a slip ratio and a slip angle based on the tire steering angle, and adjusting volume of the tire slip sound depending on the predicted slip ratio and the predicted slip angle of the vehicle.

The controlling of the sound output device may comprise determining a time point when the tire slip sound is generated, based on the longitudinal force and the lateral force.

The generating of the tire slip sound may comprise calculating a shear contact force due to a slip angle by the lateral force and friction on a tire ground surface and reflecting a correlation between the shear contact force and the tire slip sound to design the tire slip sound.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
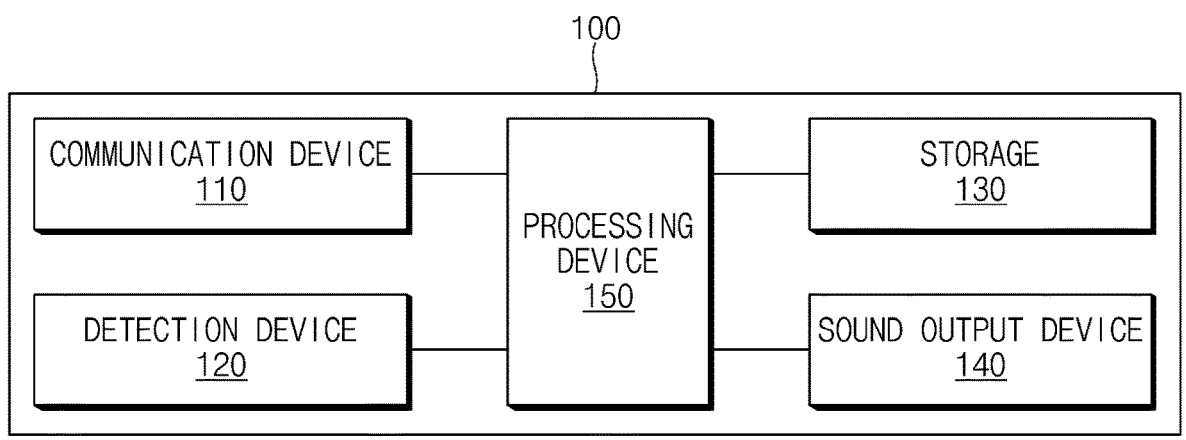
FIG. 1 is a block diagram illustrating a configuration of an apparatus for generating a sound of an electrification vehicle according to exemplary embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for generating a sound of an electrification vehicle according to embodiments of the present disclosure.

The electrification vehicle (the electrified vehicle) may be a vehicle, such as an electric vehicle (EV), a plug-in hybrid electric vehicle (PHEV), and/or a hybrid electric vehicle (HEY), which travels using an electric motor. An apparatus 100 for generating a sound of the electrification vehicle may design a virtual sound based on a hearing experience of a user and may personalize the virtual sound by means of tone adjustment and accelerator pedal responsiveness adjustment.

Referring to FIG. 1, the apparatus 100 for generating the sound may comprise a communication device 110, a detection device 120, a storage 130, a sound output device 140, and a processing device 150.

The communication device 110 may be configured to assist the apparatus 100 to communicate with electronic control units (ECUs) loaded into the electrification vehicle (hereinafter, referred to as a "vehicle"). The communication device 110 may comprise a transceiver which transmits and receives a controller area network (CAN) message using a CAN protocol. The communication device 110 may be configured to assist the apparatus 100 to communicate with an external electronic device (e.g., a terminal, a server, and the like). The communication device 110 may comprise a wireless communication circuit, a wired communication circuit, and/or the like.

The detection device 120 may be configured to detect driving information and/or environmental information (i.e., vehicle interior environment information and/or vehicle exterior environment information). The detection device 120 may be configured to detect driving information such as a driver steering angle (or a steering wheel steering angle), a tire steering angle (or a tie rod), a vehicle speed, motor revolutions per minute (RPM), a motor torque, and/or an accelerator pedal opening amount using sensors and/or ECUs loaded into the vehicle. An accelerator pedal position sensor (APS), a steering angle sensor, a microphone, an image sensor, a distance sensor, a wheel speed sensor, an advanced driver assistance system (ADAS) sensor, a 3-axis accelerometer, an inertial measurement unit (IMU), and/or the like may be used as the sensors. The ECUs may be a motor control unit (MCU), a vehicle control unit (VCU), and/or the like.

The storage 130 may be configured to store a sound source of a virtual sound such as a tire slip sound, a warning sound, a driving sound, an acceleration sound, and/or a cornering sound. The storage 130 may be configured to store an emotion recognition model, a sound design algorithm, a volume setting algorithm, volume control logic, sound equalizer logic, and/or the like. The emotion recognition model may be implemented based on a sound-based emotion factor and a dynamic characteristic-based emotion factor. The sound-based emotion factor may comprise acceleration and deceleration of downshift emotion, slip and pedal responsiveness of drift emotion, tire slip and an exhaust sound of drive and response emotion, and/or the like. The dynamic characteristic-based emotion factor may comprise vibration of sound feedback emotion, body stiffness of ride comfort emotion, a chassis balance of maneuverability emotion, and/or the like. The sound-based emotion factor and the dynamic characteristic-based emotion factor may be derived by previously evaluating a correlation between vehicle kinetic performance and driving emotion. As an example, a slip upon stop acceleration, a jerk upon shift, and rapid acceleration wide open throttle (WOT) emotional factor correlation may be evaluated by a change in vehicle speed and motor RPM over time. A dynamic characteristic emotional factor correlation except for maneuverability upon cornering may be analyzed by a change in yaw rate and side slip angle over time. The sound design algorithm may comprise high performance sound equalizer logic in which engine sound equalizer (ESE) logic considering an engine sound is added to an existing active sound design (ASD) function, by means of a target profile and engine information (e.g., an RPM, a throttle opening amount, a torque, and/or the like).

The storage 130 may be a non-transitory storage medium which stores instructions executed by the processing device 150. The storage 130 may comprise at least one of storage media such as a random access memory (RAM), a static RAM (SRAM), a read only memory (ROM), a programmable ROM (PROM), an electrically erasable and programmable ROM (EEPROM), an erasable and programmable ROM (EPROM), a hard disk drive (HDD), a solid state disk (SSD), an embedded multimedia card (eMMC), a universal flash storage (UFS), and/or a web storage.

The sound output device 140 may be configured to play and output a virtual sound to speakers loaded into the vehicle. The sound output device 140 may be configured to play and output a sound source which is previously stored or is streamed in real time. The sound output device 140 may comprise an amplifier, a sound playback device, and the like. The sound playback device may be configured to adjust and play volume, a tone (or sound quality), a sound image, and the like of the sound under an instruction of the processing device 150. The sound playback device may comprise a digital signal processor (DSP), microprocessors, and/or the like. The amplifier may be configured to amplify an electrical signal of the sound played from the sound playback device.

The processing device 150 may be electrically connected with the respective components 110 to 140. The processing device 150 may comprise at least one of processing devices such as an application specific integrated circuit (ASIC), a digital signal processor (DSP), programmable logic devices (PLD), field programmable gate arrays (FPGAs), a central processing unit (CPU), microcontrollers, and/or microprocessors.

The processing device 150 may be configured to detect (or obtain) driver manipulation information, vehicle interior environment information, vehicle exterior environment information, and the like by means of the detection device 120. Herein, the driver manipulation information may comprise a driver steering angle, a tire steering angle, and/or the like. The vehicle interior environment information may comprise information such as an indoor air temperature, a pedal opening amount, a wheel speed-based vehicle speed, and/or a throttle opening amount. The vehicle exterior environment information may comprise an outdoor air temperature, a GPS-based vehicle speed, and/or the like. The processing device 150 may be configured to design a virtual sound based on the driver manipulation information, the vehicle interior environment information, the vehicle exterior environment information, and/or the like and may be configured to adjust a tone, volume, and the like of the virtual sound.

The processing device 150 may be configured to detect manipulation of a driver using the detection device 120 while the vehicle is traveling. In other words, the processing device 150 may be configured to detect a driver steering angle and a tire steering angle according to the manipulation of the steering wheel of the driver. The processing device 150 may be configured to determine a vehicle driving state based on the driver steering angle and/or the tire steering angle. Herein, the vehicle driving state may be divided into a constant speed state, an acceleration state, and a cornering state.

The processing device 150 may be configured to analyze a longitudinal force, a lateral force, a tire slip ratio, and a tire slip angle based on the driver steering angle and the tire steering angle and may be configured to calculate a cornering force based on the analyzed results. The processing device 150 may be configured to measure front, center, and rear displacements of a vehicle body by means of vehicle-related parameters, that is, the longitudinal force, the lateral force, and the driver steering angle and may be configured to detect a vibration signal due to load transfer. The processing device 150 may be configured to provide a deviation for tire pressure and tire temperature between front wheels and rear wheels in numerical value using tire-related parameters, that is, a tire slip ratio, a tire slip angle, and a tire steering angle.

The processing device 150 may be configured to play at least one sound according to a change in parameter associated with the vehicle and the tire in a time domain to generate an initial sound source. The processing device 150 may be configured to generate a virtual sound by a cornering force to play the virtual sound on a time axis. The processing device 150 may be configured to change a tone of the virtual sound by means of gain control and may be configured to adjust resistance of the virtual sound to design the virtual sound (e.g., a tire slip sound). At this time, the processing device 150 may be configured to design the virtual sound using a tire slip sound generation algorithm.

Furthermore, the processing device 150 may be configured to calculate a contact force using a tire ground surface and road surface profile based on big data. At this time, the processing device 150 may be configured to calculate a shear contact force by information about a slip angle vs lateral force and a slip on a tire ground surface using a system analysis model by the tire and the road surface (or a tire and road surface profile condition). In other words, the processing device 150 may be configured to calculate the shear contact force with regard to a slip angle by a lateral force of the vehicle and friction (or a friction coefficient) on the tire ground surface. The calculated shear contact force may be used to design a tire slip sound in which driving emotion of a high-performance vehicle driver on a racing track is reflected.

The processing device 150 may be configured to accumulate analysis results by a tire ground surface and road surface profile based on big data in a database (DB) by means of a tire analysis of stop (or ground loading) and a driving condition (or a tire rolling effect). The tire rolling effect upon the tire analysis may be implemented based on theoretical background(s) of the gyroscopic effect and/or the Doppler effect. The analysis results may comprise a normal contact force, a shear contact force, and the like. Herein, the normal contact force may refer to a vertical contact force by a weight, and the shear contact force may refer to a shear direction contact force by a slip. An analysis result DB (or big data) may be used to estimate the shear contact force due to a slip angle and friction by a lateral force.

The processing device 150 may be configured to reflect a correlation between the shear contact force and the tire slip sound to design the virtual sound (i.e., the tire slip sound). The processing device 150 may be configured to monitor a state of the vehicle, that is, a slip ratio of the vehicle in real time and may be configured to adjust volume of the virtual sound with reference to a current slip ratio of the vehicle.

The processing device 150 may be configured to adjust a tone and volume of the virtual sound based on the calculated cornering force. The processing device 150 may be configured to perform pitch control, gain control, APS control, frequency filtering, Shepard layer control, volume adjustment, and/or the like for the vehicle sound. The pitch control is to adjust pitch, and the gain control is to change a tone and adjust resistance. The APS control is to adjust a response degree (or responsiveness) according to APS resistance, that is, accelerator pedal pressure, and the frequency filtering is to adjust a playback frequency band of a sound. The Shepard layer control is to generate a second sound source and adjust an adjustment region of the sound source.

The processing device 150 may be configured to control the sound output device 140 to play a virtual sound by reflecting a vehicle environment, a driving environment, and/or tire ground surface information using the sound design algorithm. The tire slip sound may be used to perform an emotional sound design of a vehicle body and tire slip based on lateral acceleration with regard to a load transfer mechanism when the vehicle turns. The sound output device 140 may be configured to finally play a sound to reflect the concept of the tire slip sound and reflect real racing track emotion by means of an amplifier.

Figure 2:
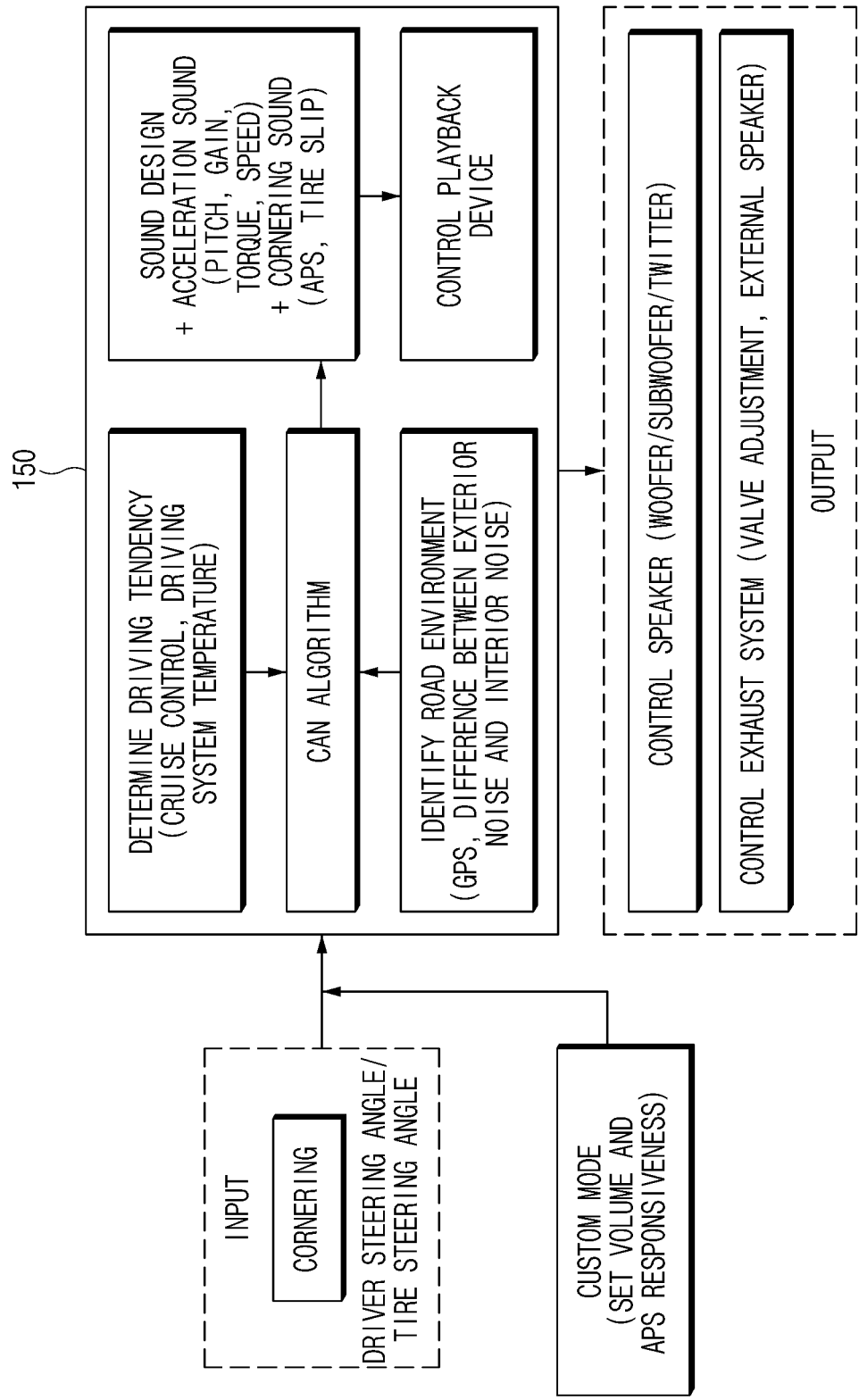
FIG. 2 is a drawing illustrating a function of a processing device of an apparatus for generating a sound of an electrification vehicle according to exemplary embodiments of the present disclosure.

FIG. 2 is a drawing illustrating a function of a processing device of an apparatus for generating a sound of an electrification vehicle according to embodiments of the present disclosure.

A processing device 150 may be configured to determine a vehicle driving state by means of vehicle state information, for example, an RPM, a torque, a steering angle, or the like, which is obtained by a detection device 120 of FIG. 1. Herein, the vehicle driving state may be divided into a constant speed state, an acceleration state, and a cornering state.

The processing device 150 may be configured to output a virtual sound, that is, an acceleration sound, a cornering sound, and/or the like to a sound output device 140 of FIG. 1 by means a CAN algorithm, a sound design, and playback device control.

The processing device 150 may be configured to determine a driving tendency based on information such as cruise control and a driving system temperature by means of the CAN algorithm. The processing device 150 may be configured to determine a road environment based on information such as GPS information and a difference between exterior noise and interior noise based on the CAN algorithm. The processing device 150 may be configured to design a virtual sound based on the determined driving tendency and the determined road environment. The processing device 150 may be configured to design the virtual sound based on a pitch, a gain, a torque, a speed, and the like. The processing device 150 may be configured to design a cornering sound based on an APS, a tire slip, and the like.

The processing device 150 may be configured to control a playback device to play the designed virtual sound. The playback device may be configured to adjust sound quality, volume, and the like of the virtual sound played under an instruction of the processing device 150. The processing device 150 may be configured to control a speaker and an exhaust system to output the virtual sound played by the playback device.

Figure 3:
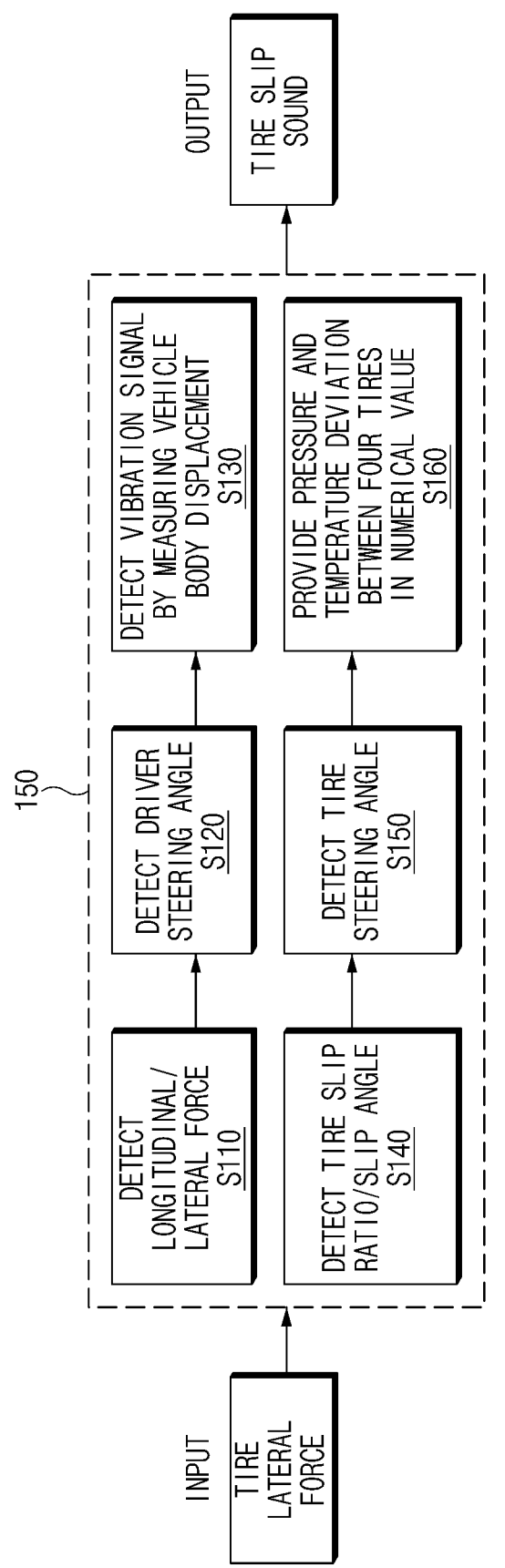
FIG. 3 is a drawing illustrating a process of deriving a parameter to generate a tire slip sound according to exemplary embodiments of the present disclosure.

FIG. 3 is a drawing illustrating a process of deriving a parameter to generate a tire slip sound according to embodiments of the present disclosure.

An apparatus 100 for generating a sound in FIG. 1 may be configured to play a tire slip sound according to a tire lateral force. A processing device 150 of the apparatus 100 for generating the sound may be configured to detect a vehicle-related parameter and a tire-related parameter using a detection device 120 of FIG. 1.

In S110, the processing device 150 of the apparatus 100 for generating the sound may be configured to detect a longitudinal force and a lateral force by means of the detection device 120. In S120, the processing device 150 may be configured to detect a driver steering angle, that is, a steering angle of a steering wheel using the detection device 120. In S130, the processing device 150 may be configured to measure a vehicle body displacement based on the longitudinal force, the lateral force, and the driver steering angle, which are vehicle-related parameters, to detect a vibration signal.

In S140, the processing device 150 may be configured to detect a tire slip ratio and a tire slip angle using the detection device 120. In S150, the processing device 150 may be configured to detect a tire steering angle by means of the detection device 120. In S160, the processing device 150 may be configured to provide a deviation for tire pressure and tire temperature between front wheels and rear wheels (four tires) in numerical value using the tire slip ratio, the tire slip angle, and the tire steering angle, which are tire-related parameters.

Because the tire slip sound which is a virtual sound is an event-like sound, the processing device 150 may be configured to play a sound at a time when the longitudinal force and the lateral force are generated over a predetermined threshold. The processing device 150 may be configured to predict a sound generation time point based on a steering wheel (or a driver steering angle) according to manipulation of the steering wheel of a driver. As an excessive displacement of the actual vehicle occurs, when a displacement where the vehicle may slip, that is, a longitudinal force and a lateral force are detected over the predetermined threshold, the processing device 150 may be configured to play a tire slip sound.

Furthermore, the processing device 150 may be configured to monitor an actual tire steering angle when playing the tire slip sound, may be configured to predict a slip ratio and a slip angle of the vehicle, and may be configured to design a final sound based on the predicted slip ratio and the predicted slip angle. Because slip angles of four tires are different from each other from the turning center of the vehicle, as slip ratios of the four tires are also differently shown and as sounds generated by playback devices (e.g., speakers, vibrators, or the like) close to positions of the respective tires are different in level from each other, emotional equality of the tire slip sound may be improved.

Figure 4:
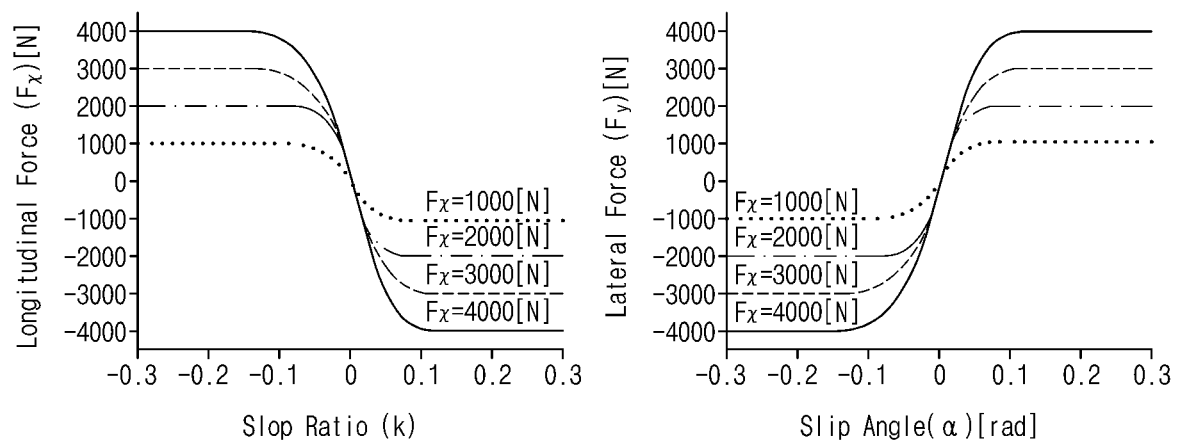
FIG. 4 is an analysis diagram illustrating a correlation between parameters according to exemplary embodiments of the present disclosure.

FIG. 4 is an analysis diagram illustrating a correlation between parameters according to embodiments of the present disclosure.

An apparatus 100 for generating a sound in FIG. 1 should refer to a lateral force generated when a vehicle steers to optimize emotional quality when generating a tire slip sound, but may not directly monitor and obtain a CAN signal. Thus, the apparatus 100 for generating the sound may be configured to combine factors (or parameters) capable of estimating a lateral force to generate a diagram and may be configured to design a slip sound with reference to the diagram.

There are a slip ratio and a slip angle as diagrams capable of predicting (or estimating) a lateral force. Such diagrams are highly verified data because of being used to develop ride and handling (R&H) performance.

The apparatus 100 for generating the sound may be configured to adjust volume of a tire slip sound source using the slip ratio and slip angle diagrams of the vehicle. The farther away from the "0" value of each diagram shown in FIG. 4, the more the apparatus 100 for generating the sound may be configured to increase volume. The closer to the "0" value of each diagram, the more the apparatus 100 for generating the sound may be configured to decrease volume. Differences between the "0" value and the slip ratio and the slip angle of the actual vehicle may be represented as a change in volume of the tire slip sound. A volume difference according to a diagram interval may be used as a sound design element.

Furthermore, as a vehicle which uses tires, each of which has excellent traction, which are used by a high-performance vehicle, uses a volume diagram similar to a diagram where Fx=4000 [N] and as a vehicle which uses tires, each of which has relatively degraded traction, which are used in a normal vehicle, uses a diagram close to a diagram where Fx=1000 [N], a sound may be designed to match volume of the tire slip sound to a behavior of an actual vehicle.

As such, the apparatus 100 for generating the sound may be configured to perform a sound design using the slip ratio and slip angle diagrams of the vehicle to minimize a sense of difference with dynamic motion of the vehicle, thus improving emotional quality of the virtual sound.

Figure 5:
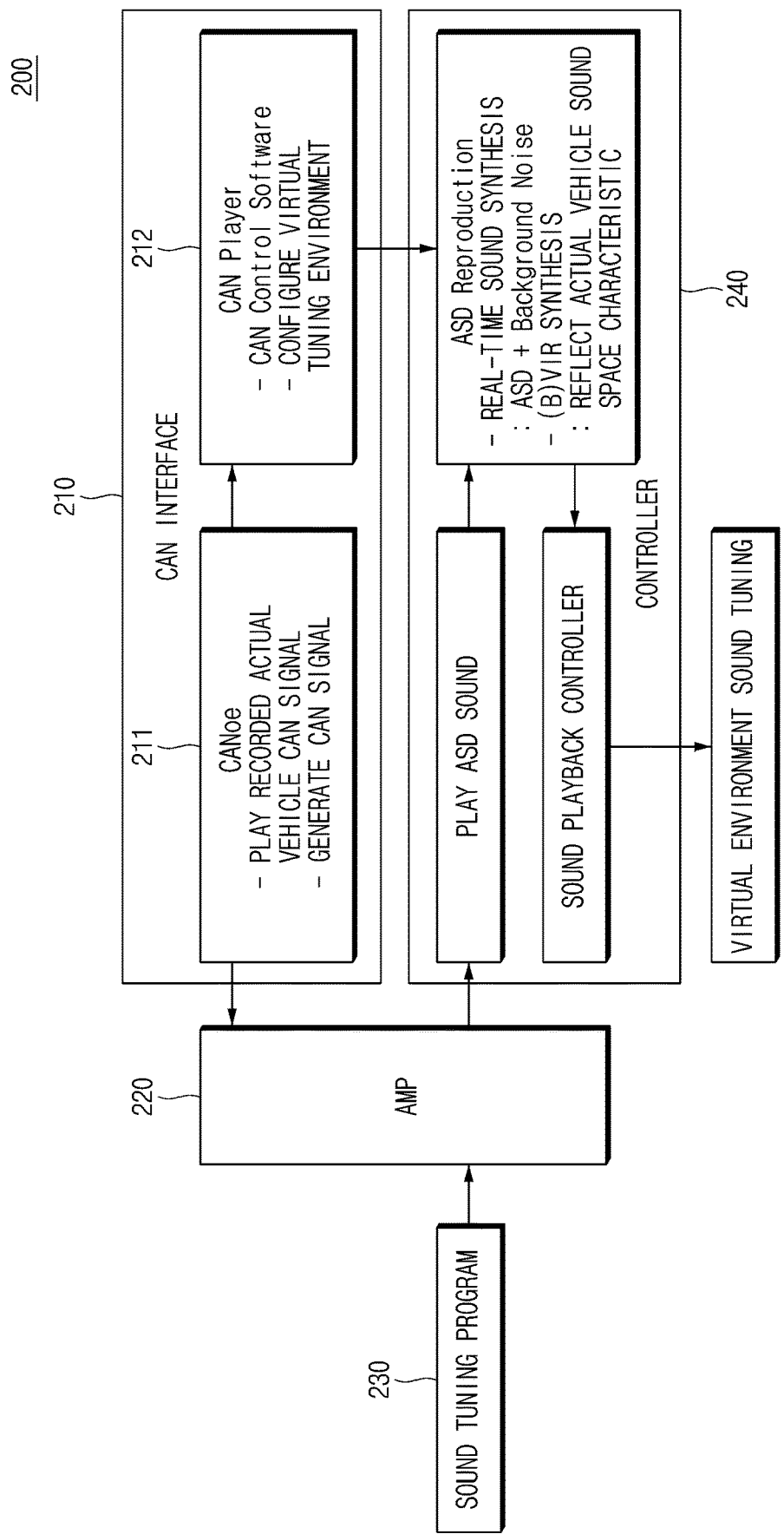
FIG. 5 is a drawing illustrating a configuration of a virtual environment sound tuning simulator according to exemplary embodiments of the present disclosure.

FIG. 5 is a drawing illustrating a configuration of a virtual environment sound tuning simulator according to embodiments of the present disclosure.

A virtual environment sound tuning simulator 200 may be configured to perform virtual environment sound turning using ASD hardware in loop simulation (HiLS). The virtual environment sound tuning simulator 200 may comprise a CAN interface 210, an AMP 220, a sound tuning program 230, and a controller 240.

The CAN interface 210 may be configured to record, play, generate, or transmit and receive actual vehicle driving information between the respective devices. In other words, the CAN interface 210 may be configured to serve as a CAN signal transceiver which transmits and receives a CAN signal collected in an actual vehicle with the AMP 220 and the controller 240. The CAN interface 210 may be configured to generate a CAN signal including a parameter calculated by the virtual environment sound tuning simulator 200 and may be configured to transmit the generated CAN signal to the AMP 220.

The CAN interface 210 may comprise a controller area network open environment (CANoe) 211 and a CAN player 212, which play the same signal as the vehicle using a CAN signal obtained in the vehicle or may manipulate the obtained signal and transmit and receive a CAN signal between the AMP 220 and the controller 240.

The AMP 220 may be configured to receive a tuning parameter of the sound tuning program 230. The AMP 220 may be configured to calculate an output value according to the turning parameter and the CAN signal.

The controller 240 may be configured to perform the overall operation of the virtual environment sound tuning simulator 200, may be configured to store and manage default interior sound data generated by recording an NVH sound of the actual vehicle, may be configured to store and manage sound field characteristic information (e.g., a binaural vehicle impulse response (BVIR)) from a sound source (e.g., a speaker) in the actual vehicle to ears of a person, and may be configured to generate, collect, and process a CAN signal capable of identifying an operation state of the vehicle.

The controller 240 may be configured to play an ASD sound based on the output value (or an output signal) calculated by the AMP 220. The controller 240 may be configured to synthesize a sound (e.g., background noise) recorded in the actual vehicle with the played ASD sound to generate a composite sound. Furthermore, the controller 240 may be configured to reflect an actual vehicle sound space characteristic, that is, BVIR information in the generated composite sound to generate a final composite sound.

The controller 240 may comprise a sound playback controller. The sound playback controller may be configured to output the final composite sound. In other words, the sound playback controller may be configured to perform sound tuning of the final composite sound in a virtual environment.

The controller 240 may be configured to allow a user to listen to the tuned sound using a VR simulator which simulates a virtual driving environment and may be configured to perform a verification procedure by means of hearing experience feedback on the tuned sound. The controller 240 may be configured to repeatedly perform verification of the tuned sound and sound tuning based on the verified result to provide hearing experience of an actual vehicle level.

Figure 6:
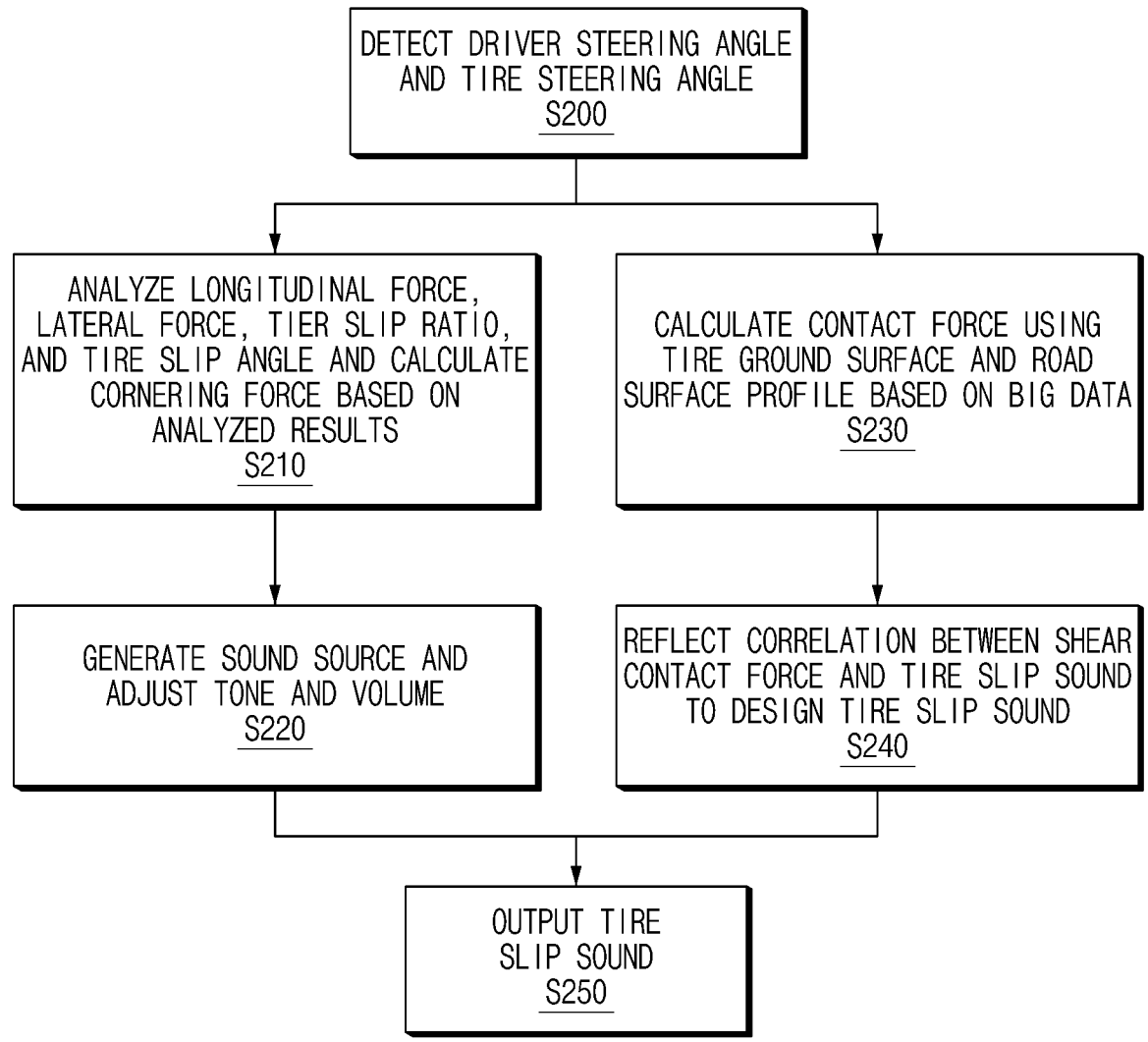
FIG. 6 is a flowchart illustrating a method for generating a sound of an electrification vehicle according to exemplary embodiments of the present disclosure.

FIG. 6 is a flowchart illustrating a method for generating a sound of an electrification vehicle according to embodiments of the present disclosure.

In S200, a processing device 150 of an apparatus 100 for generating a sound in FIG. 1 may be configured to detect a driver steering angle and a tire steering angle. The processing device 150 may be configured to detect a driver steering angle and a tire steering angle according to manipulation of the steering wheel of a driver using a detection device 120 of FIG. 1 while a vehicle is traveling. The processing device 150 may be configured to determine where a vehicle driving state is a cornering state based on the driver steering angle and the tire steering angle.

In S210, the processing device 150 may be configured to analyze a longitudinal force, a lateral force, a tire slip ratio, and a tire slip angle based on the driver steering angle and the tire steering angle and may be configured to calculate a cornering force based on the analyzed results. The processing device 150 may be configured to measure front, center, and rear displacements of a vehicle body by means of vehicle-related parameters, that is, the longitudinal force, the lateral force, and the driver steering angle and may be configured to detect a vibration signal due to load transfer. The processing device 150 may be configured to provide a deviation for tire pressure and tire temperature between front wheels and rear wheels, that is, four tires in numerical value using tire-related parameters, that is, the tire slip ratio, the tire slip angle, and the tire steering angle.

In S220, the processing device 150 may be configured to generate a sound source based on the calculated cornering force and may be configured to adjust a tone and volume of the generated sound source. The processing device 150 may be configured to play at least one sound according to a change in parameter associated with the vehicle and the tire in a time domain to generate an initial sound source. The processing device 150 may be configured to generate a virtual sound by a cornering force to play the virtual sound in the time domain (or a time axis). The processing device 150 may be configured to change a tone of the virtual sound by means of gain control and may be configured to adjust resistance of the virtual sound to design the virtual sound (e.g., a tire slip sound). At this time, the processing device 150 may be configured to design the virtual sound using a tire slip sound generation algorithm.

In S230, the processing device 150 may be configured to calculate a contact force using a tire ground surface and road surface profile based on big data. At this time, the processing device 150 may be configured to calculate a shear contact force by information about a slip angle vs lateral force and a slip on a tire ground surface using a system analysis model by the tire and the road surface (or a tire and road surface profile condition). The calculated shear contact force may be used to design a tire slip sound in which driving emotion of a high-performance vehicle driver on a racing track is reflected.

In S240, the processing device 150 may be configured to reflect a correlation between the shear contact force and the tire slip sound based on the calculated contact force to design a tire slip sound.

In S250, the processing device 150 may be configured to play and output the designed virtual sound, that is, the tire slip sound using a sound output device 140 of FIG. 1. The processing device 150 may be configured to determine a time point when the tire slip sound is generated (i.e., a playback time point) based on the driver steering angle and the tire steering angle. For example, the processing device 150 may be configured to instruct the sound output device 140 to play the tire slip sound at a time when the driver steering angle and the tire steering angle are greater than or equal to a predetermined threshold. The processing device 150 may be configured to monitor a state of the vehicle, that is, a slip ratio of the vehicle in real time and may be configured to adjust volume of the virtual sound with reference to a current slip ratio of the vehicle. The processing device 150 may be configured to monitor a tire steering angle to predict a slip ratio and a slip angle of the vehicle and may be configured to finally design a sound matched with the predicted slip ratio and the predicted slip angle with reference to slip ratio and slip angle diagrams of the vehicle.

Embodiments of the present disclosure may provide the driver with fun and emotional satisfaction by generating a tire slip sound when a ground slip of the vehicle occurs, when the vehicle turns.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for generating a sound of an electrification vehicle, the apparatus comprising:
   a detection device configured to detect state information of a vehicle;
   a sound output device configured to play and output a virtual sound; and
   a processing device connected with the detection device and the sound output device, wherein the processing device is configured to:
     detect a cornering state of the vehicle based on the state information of the vehicle;
     analyze a longitudinal force, a lateral force, a tire slip ratio, and a tire slip angle, according to the cornering state, generating analyzed results;
     calculate a cornering force based on the analyzed results;
     calculate a contact force based on a tire ground surface and road surface profile based on big data;

generate a tire slip sound based on the cornering force and the contact force; and
control the sound output device to play the tire slip sound.

2. The apparatus of claim 1, wherein the processing device is configured to determine whether a vehicle driving state is a cornering state based on a driver steering angle and a tire steering angle input from the detection device.

3. The apparatus of claim 2, wherein the processing device is configured to:
measure a vehicle body displacement based on the longitudinal force, the lateral force, and the driver steering angle, to detect a vibration signal; and
detect a pressure and temperature deviation between tires based on the tire slip ratio, the tire slip angle, and the tire steering angle.

4. The apparatus of claim 3, wherein the processing device is configured to:
generate an initial sound source of the tire slip sound based on the cornering force;
predict a slip ratio and a slip angle of the vehicle based on the tire steering angle; and
adjust volume of the tire slip sound depending on the slip ratio and the slip angle of the vehicle.

5. The apparatus of claim 1, wherein the processing device is configured to determine a time point when the tire slip sound is generated, based on the longitudinal force and the lateral force.

6. The apparatus of claim 1, wherein the processing device is configured to:
calculate a shear contact force due to a slip angle by the lateral force and friction on a tire ground surface; and
reflect a correlation between the shear contact force and the tire slip sound to design the tire slip sound.

7. A method for generating a sound of an electrification vehicle, the method comprising, by a processing device:
detecting a cornering state of the vehicle based on state information of the vehicle, the state information being detected by a detection device;
analyzing a longitudinal force, a lateral force, a tire slip ratio, and a tire slip angle according to the cornering state of the vehicle, generating analyzed results;
calculating a cornering force based on the analyzed results;
calculating a contact force based on a tire ground surface and road surface profile based on big data;
generating a tire slip sound based on the cornering force and the contact force; and
controlling a sound output device to play the tire slip sound.

8. The method of claim 7, wherein the detecting of the cornering state of the vehicle comprises:
determining, by the processing device, whether a vehicle driving state is a cornering state based on a driver steering angle and a tire steering angle input from the detection device.

9. The method of claim 7, wherein the calculating of the cornering force comprises, by the processing device:
measuring a vehicle body displacement based on the longitudinal force, the lateral force, and a driver steering angle to detect a vibration signal; and
detecting a pressure and temperature deviation between tires based on the tire slip ratio, the tire slip angle, and a tire steering angle.

10. The method of claim 9, wherein the generating of the tire slip sound comprises, by the processing device:
generating an initial sound source of the tire slip sound based on the cornering force;
predicting a slip ratio and a slip angle based on the tire steering angle; and
adjusting volume of the tire slip sound depending on the slip ratio and the slip angle of the vehicle.

11. The method of claim 7, wherein the controlling of the sound output device comprises:
determining, by the processing device, a time point when the tire slip sound is generated based on the longitudinal force and the lateral force.

12. The method of claim 7, wherein the generating of the tire slip sound comprises, by the processing device:
calculating a shear contact force due to a slip angle by the lateral force and friction on a tire ground surface; and
reflecting a correlation between the shear contact force and the tire slip sound to design the tire slip sound.

* * * * *